United States Patent [19]
Langhorst

[11] Patent Number: 5,821,649
[45] Date of Patent: Oct. 13, 1998

[54] ELECTROSTATIC SHIELDING SYSTEM FOR REDUCTION OF BEARING CURRENTS IN ELECTRIC MOTORS

[75] Inventor: Phillip G. Langhorst, Crestwood, Mo.

[73] Assignee: MagneTek, Inc., Nashville, Tenn.

[21] Appl. No.: 516,975

[22] Filed: Aug. 18, 1995

[51] Int. Cl.$^6$ .......................... H02K 1/00; H01R 13/629
[52] U.S. Cl. .......................... 310/68 R; 310/71; 310/214; 310/215
[58] Field of Search .................................. 310/68 R, 71, 310/254, 258, 260, 196, 58, 59, 64, 215, 214

[56] References Cited

U.S. PATENT DOCUMENTS

| | | | |
|---|---|---|---|
| 3,824,683 | 7/1974 | Rhudy | 29/596 |
| 3,867,658 | 2/1975 | Dochterman | 310/71 |
| 4,172,230 | 10/1979 | Benezech | 310/70 |
| 4,485,796 | 12/1984 | Boyer | 123/617 |
| 4,925,400 | 5/1990 | Blair et al. | 439/374 |
| 4,949,001 | 8/1990 | Campbell | 310/220 |
| 5,319,276 | 6/1994 | Schuler | 310/196 |
| 5,430,931 | 7/1995 | Fisher et al. | 29/596 |
| 5,661,353 | 8/1997 | Erdman et al. | 310/86 |

Primary Examiner—Steven L. Stephan
Assistant Examiner—Tran N. Nguyen
Attorney, Agent, or Firm—Waddey & Patterson; Mark J. Patterson

[57] ABSTRACT

An electrostatic shielding system is provided for an AC motor to eliminate generation of destructive motor bearing currents. Conductive end turn shields are layered over the stator coil end turns at each end of the stator. Conductive grounding clips mechanically and electrically engage the end turn shields at one end of the clip, and electrically and mechanically engage the slotted openings in the stator at the other end. Conductive strips extend longitudinally along the stator slotted openings.

14 Claims, 4 Drawing Sheets

DETAIL A

SEE DETAIL A

DETAIL A

ELECTROSTATIC SHIELDING SYSTEM FOR REDUCTION OF BEARING CURRENTS IN ELECTRIC MOTORS

BACKGROUND OF THE INVENTION

The present invention relates generally to rotating electrical machinery such as motors and generators, and more particularly to shielding systems and devices for preventing or minimizing the generation of destructive bearing currents which can be induced in AC electric motors.

Those skilled in the design and operation of rotating electrical machines have long recognized problems created by unwanted shaft voltages and bearing currents which can be induced as a consequence of routine operation of the machine. For example, conventional alternating current (AC) induction motors are often driven by a pulse width modulated (PWM) inverter source. The high frequency pulses from the inverter can create an electric field between the stator and rotor of the motor. As a consequence of this electrostatic field and capacitive coupling between the stator and rotor, a voltage can be induced in the shaft of the motor. If the shaft is not grounded, the induced shaft voltage can result in an unwanted current flow through a path created by the shaft, bearings and motor frame. Even though the induced shaft voltage may be low, the relatively low impedance of the bearings and current path can produce a circulating current of relatively high magnitude.

Frequently associated with steady or intermittent bearing currents are arcing between the bearings and the bearing race. Over time, this arcing can produce pitting of the metal surfaces and possible traumatic motor failure.

Several solutions to the bearing current problem have been proposed or used in the prior art, with limited success. One solution has been to ground the motor shaft, using a grounding mechanism incorporating a brush and contact structure. This adds unnecessary expense to the motor and the brush device is subject to wear.

Others have eliminated bearing currents by electrically insulating the bearings to interrupt the current path. This is generally found to be an unacceptable remedy because of the high expense involved. Also, it does not eliminate the unwanted shaft voltage.

To address the specific problem of electrostatic induction of shaft voltages and bearing currents, some in the art have proposed the use of a conductive foil covering stator slots between the stator and rotor of the motor. This forms a partial electrostatic shield by interrupting any capacitive coupling from a portion of the stator to the rotor. Such a shield is constructed by using adhesive-backed copper foil tape to cover the slot area in the stator and connecting the strips to the motor frame using a grounding strap. Unfortunately, this is not a practical long-term solution to the problem because these are additional parts, which must be manually inserted, further requiring additional holes, screws, and other parts to provide grounding to the frame.

What is needed, then, and not found in the prior art, is an inexpensive and practical system for eliminating or minimizing electrostatic induction of shaft voltages and bearing currents in an AC motor.

SUMMARY OF THE INVENTION

To minimize or prevent the electrostatic induction of voltage on the shaft of an AC motor, and the destructive bearing currents which can result therefrom, a Faraday or electrostatic barrier is formed on the stator assembly of the motor to electrostatically isolate the stator coil windings from the rotor. First and second conductive end turn shields are layered over the stator coil end turns at each end of the stator. A grounding clip, having at its shield end one or more projecting members, mechanically and electrically contacts the upper surface of the conductive end turn shields. At the slot end of the grounding clip, a plurality of teeth are biased outwardly so that the teeth can mechanically and electrically engage and be retained in the slotted openings formed through the inner wall of the stator core. In another embodiment, the shield end of the clip has an angled edge so that it can bend around the shield. A further embodiment of the clip has upper and lower jaw-like members at the shield end to engage the top and bottom surfaces of the shield.

To complete the electrostatic barrier, conductive strips are inserted in the slotted openings in the stator core with each conductive strip electrically connected to the core.

DESCRIPTION OF THE PREFERRED EMBODIMENT

Figure 1:
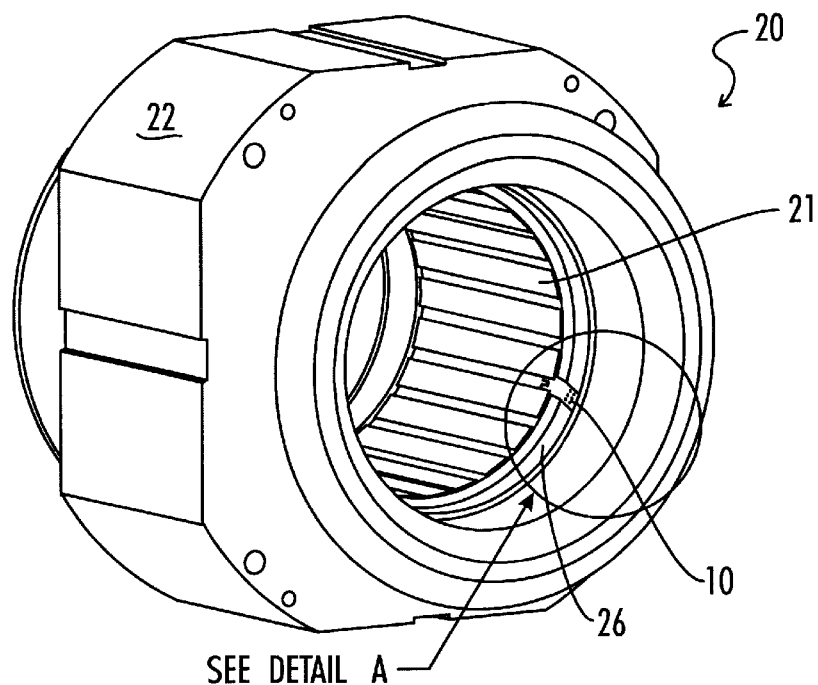
FIG. 1 is an isometric view of a stator assembly for an AC motor also showing the conductive strips, electrostatic end turn shield, and grounding clip of the present invention as installed.
Figure 2:
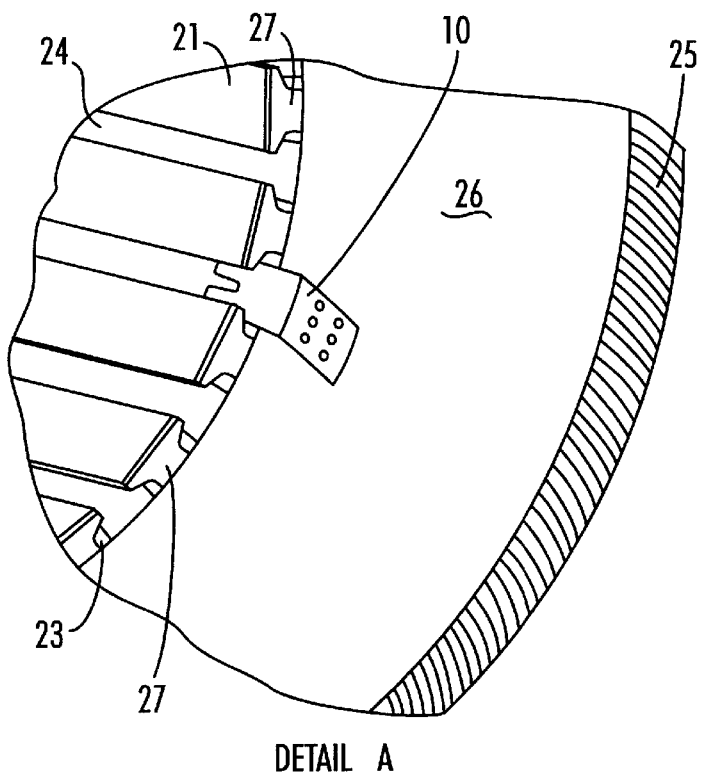
FIG. 2 is an enlarged view of detail area A of FIG. 1.
Figure 3:
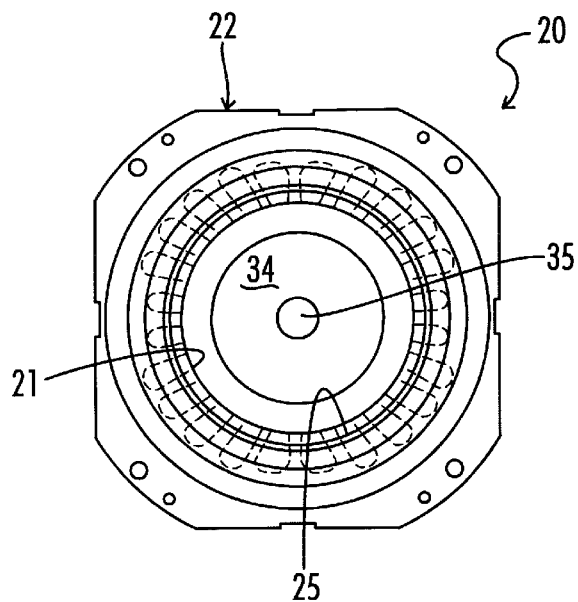
FIG. 3 is an end view of the stator assembly of FIG. 1, also showing the position of the rotor.

In FIGS. 1–6, a first embodiment of the electrostatic shielding system of the present invention is shown. Looking first at FIG. 1, a stator assembly 20 for an AC induction motor of generally conventional design is shown which includes a cylindrical stator core 21 made of iron or other conductive metal mounted within a housing 22. As is well known in the prior art, stator core 21 is preferably constructed by joining multiple circular lamination, each of which includes a series of spaced lamination teeth 27 (FIG. 2) formed along the annular inner margin of the lamination. Therefore, as best seen in FIG. 2, when the laminations of the stator core 21 are joined together, they define multiple evenly spaced slotted openings 23 (FIG. 2) around the inner wall of the core 21.

A conventional stator coil, including coil end turns 25 (FIG. 2), is wound around the stator core 21, also in conventional fashion. As is well known in the art, the electrically excited stator coil electromagnetically interacts with the rotor 34 (FIG. 3) in the motor, causing the rotor 34 and shaft 35 to rotate. In a conventional AC motor, the top portion of the slotted openings 23 in the stator assembly 20 would each be covered with an insulating stick typically formed by laminating several layers of non-conductive material together. This, however, exposes the central portion of the stator coil (not shown) underneath the slotted openings 23 to electrostatic coupling with the rotor and shaft assembly which is centrally disposed within stator assembly 20. In accordance with the present invention, a conductive layer is added to the conventional slot top sticks to form conductive strips 24 extending longitudinally along and within each slotted opening 23, with the conductive layer being in electrical contact with the stator core 21.

To provide additional electrostatic shielding for stator coil end turns 25 located at each end of the stator assembly 20, a conductive end turn shield 26 is layered over the top of stator coil end turns 25 at each end of the stator. Preferably, each end turn shield 26 will include an upper conductive layer and a lower insulating layer electrically isolating the shield 26 from the stator coil end turns 25. Shield 26 will generally have a total thickness of between 0.010" and 0.020" and is secured to the end turns 25 by laces applied during the normal lacing process. In a preferred embodiment of the invention, shield 26 is made of a polyester fleece impregnated with a special varnish which includes carbon black to render it conductive. An example of such a product is CONTAFEL-H2014 manufactured by Elektro-Isolierstoffe Isovolta of Germany. The conductive fleece layer is laminated over an insulating layer made of Mylar, Dacron, or similar non-conductive material.

Figure 4:
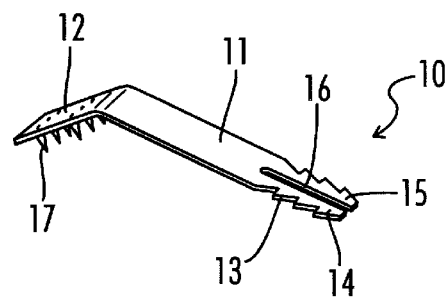
FIG. 4 is an isometric view of a first embodiment of the grounding clip of the present invention.
Figure 5:
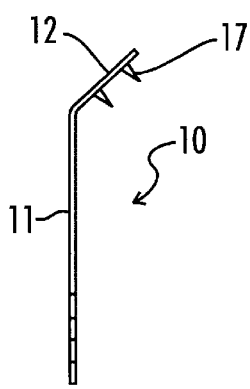
FIG. 5 is a side view of the grounding clip of FIG. 4.
Figure 6:
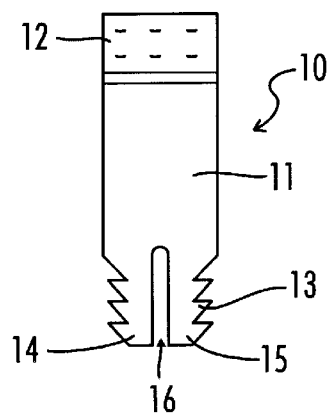
FIG. 6 is a plan view of the grounding clip of FIG. 4.

For proper functioning, each shield 26 must be electrically grounded to prevent the accumulation of electrical charge thereon. Accordingly, the present invention includes a novel grounding clip 10 to electrically connect the conductive layer of end turn shields 26 to stator core 21. A first preferred embodiment of grounding clip 10 is shown in FIGS. 4, 5, and 6. Clip 10 is formed in a generally rectangular shape of 0.015" thick spring steel, stainless steel, or other flexible conductive metal, including opposed slot and shield end sections 11 and 12. First end section 11 of clip 10 includes first and second jaw members 14 and 15 arranged in parallel to define a notched opening 16 between them. Multiple pointed teeth 13 extend laterally outward from jaw members 14 and 15.

As seen on FIG. 2, first end section 11 of grounding clip 10 is intended to mechanically and electrically engage the inner facing side walls of a slotted opening 23 in stator core 21. Accordingly, the width across first end section 11 of clip 10 is preferably slightly greater than the width of slotted opening 23, 0.25 inches for example. When first end section 11 is inserted within slotted opening 23, the resilient nature of the metal which forms clip 10 allows first and second jaw members 14 and 15 to flex slightly inward toward notched opening 16. After placement of the first end section 11 within a slotted opening 23, jaw members 14 and 15 are biased outwardly so that teeth 13 securely engage the side walls of the slotted opening 23 to retain the clip therein. The size of clip 10 can vary depending on the size and mechanical design of the motor, but in one embodiment of the clip 10, second end section is approximately 0.87 inches long, with clip 10 having an overall length of 1.25 inches. Notched opening 16 will be approximately 0.063 inches.

Second end section 12 of clip 10 is intended to mechanically and electrically engage the conductive layer of shield 26. In a preferred embodiment of clip 10, second end section 12 is provided with a plurality of spaced apart projecting members or spikes 17 which are pointed to allow multiple point electrical contact between clip 10 and shield 26. To increase the reliability of the electrical contact, as shown on FIGS. 4 and 5, clip 10 is bent at the interface 18 between first and second end sections 11 and 12, to create an angular relationship, 15 degrees for example, between first and second end sections 11 and 12. Thus, when clip 10 is placed into position proximate to shield 26, the resilient nature of the material used to manufacture clip 10 biases second end section 12 and projecting members 17 against the conductive layer of shield 26.

Figure 7:
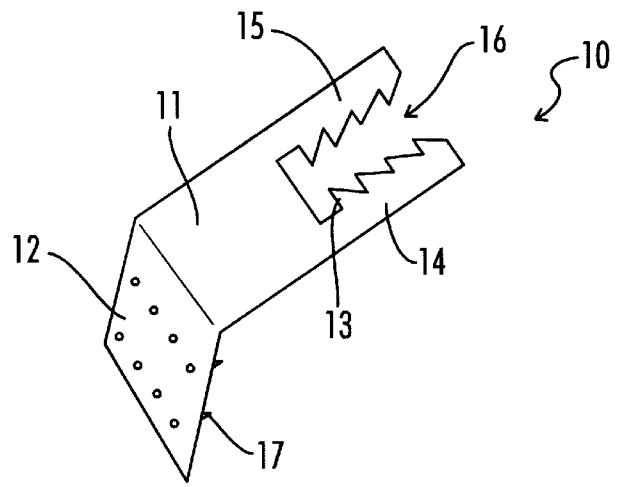
FIG. 7 is an isometric view of a second embodiment of the grounding clip of the present invention.

FIG. 7 illustrates a second embodiment of clip 10 in which teeth 13 extend inwardly from jaws 14 and 15 rather than outwardly. A clip 10 having this configuration would be useful, for example, in smaller motors having narrow slotted openings 23.

Figure 8:
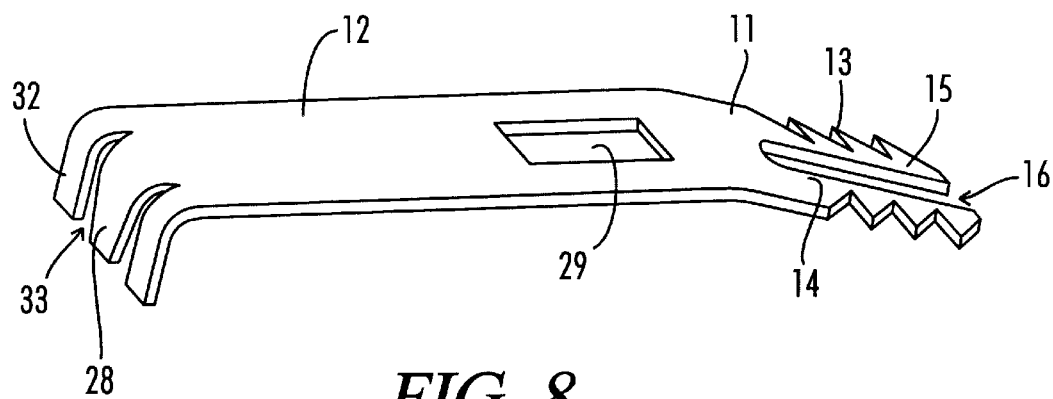
FIG. 8 is an isometric view of a third embodiment of the grounding clip of the present invention.
Figure 9:
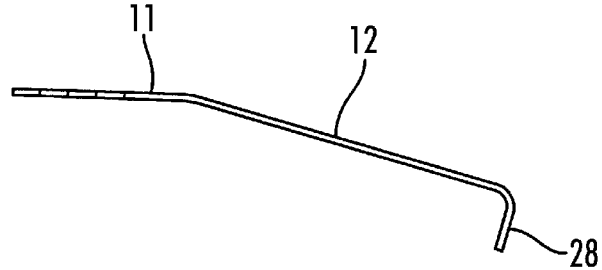
FIG. 9 is a side view of the grounding clip of FIG. 8.
Figure 10:
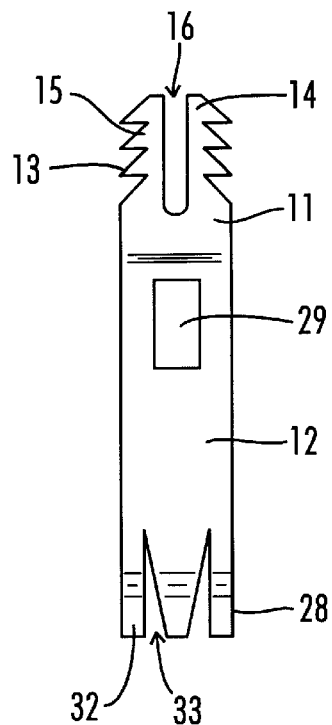
FIG. 10 is a plan view of the grounding clip of FIG. 8.

A third embodiment of clip 10 is shown in FIGS. 8, 9 and 10. Second end section 12 includes a bent edge portion 28 which defines an angled edge, 90 degrees for example, of second end section 12 which mechanically grips and electrically engages end turn shield 26. Bent edge portion 28 can be formed in one piece or, as shown in FIGS. 8 and 10, have multiple fingers 32 separated by voids 33. Also, a rectangular opening or aperture 29 is formed in end section 12 in clip 10 to receive an insertion tool (not shown) that would be used to automatically position clip 10 in the proper location.

Figure 11:
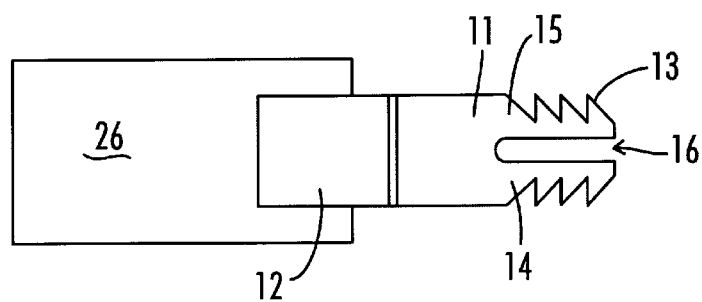
FIG. 11 is a plan view of a fourth embodiment of the grounding clip of the present invention.
Figure 12:
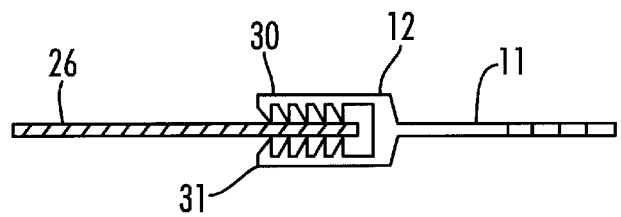
FIG. 12 is a side view of the grounding clip of FIG. 10.

Yet another embodiment of clip 10 is shown in FIGS. 11 and 12. Opposed upper and lower jaws 30 and 31 are located at the second or shield end section 12 of clip 10 and are biased towards each other. Consequently, upper and lower jaws 30 and 31 of clip 10 can engage the upper and lower surfaces of shield 26 respectively.

It will now be apparent to those skilled in the art that the combination of end turn shields 26 at each end of rotor assembly 20, multiple conductive strips 24 extending across slotted openings 23, and two grounding clips 10 which electrically connect each shield 26 to the stator core 21, produces an effective electrostatic shield covering that portion of the stator coil which would otherwise be exposed to electrostatic coupling to the rotor assembly. Consequently, induction of a voltage on the motor shaft due to electrostatic coupling between the stator and rotor is minimized, with a corresponding elimination or decrease in current through the motor bearings.

Thus, although there have been described particular embodiments of the present invention of a new and useful system for reduction of bearing currents in AC electric motors and other rotating electric machines, it is not intended that such references be construed as limitations upon the scope of this invention except as set forth in the following claims.

What I claim is:

1. A shielding system for minimizing the generation of bearing currents in a rotating electric machine having a stator, at least one stator coil, and a rotor connected to a shaft, the system comprising:

a. first shield means for limiting electrostatic generation of a voltage in the shaft, the first shield means comprising a conductive layer mounted within the machine between at least a portion of each stator coil and the rotor;

b. a first conductive clip electrically connecting the first shield means to the stator;

c. the first shield means is positioned between the rotor and a first end portion of the stator coil at a first end of the stator;

d. a second shield means for limiting electrostatic generation of voltage in the shaft, the second shield means positioned between a second end portion of the stator coil at a second end of the stator;

e. a second conductive clip electrically connecting the second shield means to the stator; and f. wherein each conductive clip includes a first clip connecting means to engage at least one slotted opening in the stator and a second clip connecting means for engaging the conductive layer of the corresponding first and second shield means.

2. The system of claim 1 further comprising a plurality of conductive strips mounted in each slotted opening, each conductive strip in electrical contact with the stator.

3. The system of claim 2 the first and second shield means each further comprising an insulating layer disposed between the conductive layer and the stator coil.

4. The system of claim 3 wherein each first clip connecting means comprises a plurality of laterally extending teeth biased outwardly toward respective side walls of the corresponding slotted opening.

5. The system of claim 4 wherein each second clip connecting means comprises at least one projecting member extending away from the clip and contacting the conductive layer of the corresponding shield means.

6. In an AC motor having a rotor and shaft rotatably mounted within a stator, the improvement comprising:

a. electrostatic stator slot shields extending along and covering slotted openings in the stator, the slot shields positioned between the stator and rotor;

b. a first electrostatic end turn shield proximate stator coil end windings at a first end of the stator;

c. a first conductive clip electrically connecting the stator to the first electrostatic end turn shield; and d. a second electrostatic end turn shield proximate stator coil end windings at a second end of the stator;

e. a second conductive clip to electrically connecting the stator to the second electrostatic end turn shield; and f. wherein, the first and second conductive clips are mechanically and electrically engaged at one end to respective ends of the stator and mechanically and electrically connected at a second end to the corresponding first and second electrostatic shields.

7. A grounding device for electrically connecting an electrostatic shield to a stator in a rotating electric machine, the grounding device comprising:

a. a conductive tab having first and second end sections;

b. the first end section including stator slot retaining means for electrically contacting and mechanically engaging a slotted opening in an inner wall of the stator; and c. the second end section including shield engagement means for electrically and mechanically engaging a conductive layer of the electrostatic shield.

8. The grounding clip of claim 7 wherein the stator slot retaining means comprises one or more teeth extending laterally from at least one side of the conductive tab, the first end section having a width sufficient to bias the teeth outwardly against opposed vertical walls of the slotted opening in the stator.

9. The grounding clip of claim 8 wherein the shield engagement means comprises a plurality of projecting members extending downwardly from a bottom surface of the tab.

10. The grounding clip of claim 8 wherein the shield engagement means comprises an edge portion of the second edge section which is bent downward to define an angled distal end of the second end section.

11. The grounding clip of claim 8 wherein the shield engagement means comprises upper and lower jaw member means for engaging top and bottom surfaces of the shield.

12. The grounding clip of claim 8 wherein the first end section is angularly disposed with respect to the second end section.

13. The grounding clip of either of claims 8, 9, 10, or 11 further comprising an aperture means for receiving a clip insertion tool.

14. A stator assembly for an AC electric motor comprising:

a. a stator having a stator coil wound on a stator core, the coil including first stator end turns wound proximate a first end of the stator and second stator end turns wound proximate a second end of the stator;

b. a plurality of slotted openings formed in an inner wall of the stator;

c. a plurality of conductive strips covering each slotted opening and electrically connected to the stator core;

d. first and second shields each comprising an upper conductive layer, the first and second shields proximate the corresponding first and second stator end turns;

e. first and second conductive clips attached to respective slotted openings in the stator and electrically connecting the stator core to a corresponding first and second shield; and f. the conductive strips and the first and second shields forming, in conjunction with the corresponding first and second conductive clips, an electrostatic barrier around a portion of the stator coil.

* * * * *